(12) United States Patent
Barber et al.

(10) Patent No.: US 7,344,789 B2
(45) Date of Patent: Mar. 18, 2008

(54) HYPERGOLIC HYDROGEN GENERATION SYSTEM FOR FUEL CELL POWER PLANTS

(75) Inventors: Jeffrey L. Barber, Golden, CO (US); Jeremiah J. Cronin, Longmont, CO (US)

(73) Assignee: CBH2 Technologies, Inc., Golden, CO (US)

( * ) Notice: Subject to any disclaimer, the term of this patent is extended or adjusted under 35 U.S.C. 154(b) by 419 days.

(21) Appl. No.: 10/884,771

(22) Filed: Jul. 1, 2004

(65) Prior Publication Data

US 2005/0031918 A1    Feb. 10, 2005

Related U.S. Application Data

(60) Provisional application No. 60/503,077, filed on Sep. 15, 2003, provisional application No. 60/493,871, filed on Aug. 7, 2003.

(51) Int. Cl.
*C01B 3/22* (2006.01)
*C01B 3/26* (2006.01)
*H01M 8/04* (2006.01)

(52) U.S. Cl. .............. 429/17; 423/648.1; 423/650; 423/651; 423/652; 423/653; 423/654

(58) Field of Classification Search ............ 423/648.1, 423/650, 651, 652, 653, 654; 429/17
See application file for complete search history.

(56) References Cited

U.S. PATENT DOCUMENTS 3,607,066 A    9/1971    Basch et al.
4,659,559 A    4/1987    Struthers .................... 429/46

(Continued)

OTHER PUBLICATIONS

Krumpelt, Chemical Technology Division, Argonne National Laboratory, "New Catalyst Enables Fuel Cells to Run on Ordinary Liquids," Aug. 2001.

(Continued)

*Primary Examiner*—Wayne A. Langel
(74) *Attorney, Agent, or Firm*—Sheridan Ross, P.C.

(57) ABSTRACT

The invention provides a controlled hypergolic approach to using concentrated hydrogen peroxide in combination with certain hydrocarbons such as ethanol, methanol, methane as well as more common fuels such as gasoline, diesel, DME, JP5, JP8 and the like to generate a gas mixture primarily composed of hydrogen and carbon dioxide. Because air is not used as the oxygen source, this novel process does not allow the formation of nitrous oxide (NOx) compounds, thereby avoiding the primary source of nitrogen contamination as well. The process is executed in a constraining system on a micro scale such that the resulting hydrogen supply is self-pressurizing. This enables the incorporation of an "on-demand" hydrogen fuel source for a variable output fuel cell power plant such as those proposed for use in automobiles, marine vessels and stationary power sources. In another embodiment of the present invention hydrogen peroxide is catalytically, or thermally reacted to provide $H_2O$ vapor and $O_2$. When this gaseous stream is introduced to the cathode of the fuel cell, the percent concentration of oxygen is increased with no corresponding increase in the parasitic power demand made by an air-moving device. This use of $H_2O_2$ as an oxygen source may be continuous, intermittent or limited to specific instances when peak power output demands or high transient loads are placed upon the FCPS.

20 Claims, 7 Drawing Sheets

U.S. PATENT DOCUMENTS

| | | | | |
|---|---|---|---|---|
| 4,714,593 | A | 12/1987 | Naito et al. | 422/197 |
| 5,401,589 | A | 3/1995 | Palmer et al. | 429/13 |
| 5,429,886 | A | 7/1995 | Struthers | 429/44 |
| 5,938,800 | A | 8/1999 | Verrill et al. | 48/127.9 |
| 6,007,930 | A | 12/1999 | Adams et al. | 429/13 |
| 6,099,983 | A | 8/2000 | Nakagaki et al. | 429/13 |
| 6,235,417 | B1 * | 5/2001 | Wachsman et al. | 429/17 |
| 6,283,723 | B1 | 9/2001 | Milburn et al. | 417/273 |
| 6,361,631 | B2 | 3/2002 | Scheffee et al. | 149/109.4 |
| 6,387,554 | B1 | 5/2002 | Verykios | 429/17 |
| 6,485,851 | B1 | 11/2002 | Narayanan et al. | 429/17 |
| 6,495,276 | B1 | 12/2002 | Brauchle et al. | 429/17 |
| 6,497,970 | B1 | 12/2002 | Fronk | 429/12 |
| 6,502,533 | B1 | 1/2003 | Meacham | 123/3 |
| 6,506,510 | B1 | 1/2003 | Sioui et al. | 429/17 |
| 6,605,376 | B2 | 8/2003 | Verykios | 429/17 |
| 6,620,537 | B2 | 9/2003 | Struthers et al. | 429/19 |
| 7,022,306 | B1 * | 4/2006 | Oroskar et al. | 423/648.1 |
| 7,226,574 | B2 * | 6/2007 | Long et al. | 423/650 |
| 2002/0110712 | A1 | 8/2002 | Struthers et al. | |
| 2003/0213594 | A1 | 11/2003 | Wellington et al. | 166/272.1 |
| 2004/0121208 | A1 | 6/2004 | James et al. | 429/31 |

OTHER PUBLICATIONS

Wanjun et al., "Recent Development of Non-toxic, Storable Fuels Hypergolic with High Strength Hydrogen Peroxide", no date.

"Hydrogen peroxide could power future cell," Purdue News Service, no date.

Geissler et al., "Kinetics and systems analysis for producing hydrogen from methanol and hydrocarbons", no date.

Stokes, "Hydrogen Peroxide for Power and Propulsion", no date.

Sun et al., "Hydrogen Generation for PEM Fuel Cells," Fuel Celi Today, no date.

"New Device Lets Fuel Cells Power Electric Cars," at www.anl.gov/OPA/frontiers96arch/hreform.html, no date.

Frolov, "The Analysis of Possible HTP Applications", no date.

Milliken & Ahmed, "Catalyst enables fuel cells to run on a variety of liquid fuels," OAAT Accomplishments, www.ott.doe.gov/success.html, Apr. 2001.

"A New Efficient Safe Direct Hydrogen Peroxide Process," Chemicals Project Fact Sheet, Office of Weatherization and Intergovernmental Program, Energy Efficiency and Renewable Energy, U.S. Department of Energy, Aug. 2002.

Geissler, "Production of Hydrogen from Methanol for PEM Fuel-Cell Applications," Paul Scherrer Institute- General Energy—Energy Material Cycles—Menthanol Reformer.txt, no date.

"Advanced Separations Technology for Efficient and Economical Recovery and Purification of Hydrogen Peroxide," Center for Environmental Restoration Systems, Advanced Separations Technology_ANL.txt, Jan. 24, 2001.

* cited by examiner

HYPERGOLIC HYDROGEN GENERATION SYSTEM FOR FUEL CELL POWER PLANTS

CROSS REFERENCE TO RELATED APPLICATIONS

This application claims priority to U.S. Provisional Patent Application Nos. 60/493,871 and 60/503,077 filed Aug. 7, 2003 and Sep. 15, 2003 respectively, which are incorporated herein in their entirety by this reference.

FIELD OF THE INVENTION

The invention resides in the field of fuel cell power systems, and specifically methods of generating, storing and metering hydrogen for a fuel cell.

BACKGROUND OF THE INVENTION

Fuel cells have the potential to become an economically viable means of converting chemical energy into electrical energy. For example, in a polymer-electrolyte membrane (PEM) fuel cell, also known as a proton exchange membrane fuel cell, hydrogen and oxygen are combined for the production of electrical energy. Air is the customary source of oxygen while the oxidant can be any hydrogen fuel stock including hydrogen, methane, natural gas and ethanol. Other than pure hydrogen, the fuel source may require a local refining process to produce the hydrogen in a form acceptable to the PEM membranes. This refining is accomplished in a reformer. The energy conversion in the fuel cell occurs through oxidation, which requires pressurization of both the oxidant and the oxidizing agent. The reforming system consumes approximately one-quarter of the air requirement of the overall power system to produce the high pressure required by the air system.

Electrical power systems utilizing fuel cells are comprised of several subsystems requiring the compression of air and/or other gases in order to operate. Each of these subsystems operates best under distinctly different pressure profiles. The most common approach to obtain all of the necessary pressures is to utilize a complete gaseous supply system including a compressor, a drive motor, a motor controller and perhaps an expander for each subsystem. This approach creates a large parasitic electrical power draw on the overall power system and therefore represents a significant increase in expense, size and inefficiency of the power system.

Hydrogen peroxide ($H_2O_2$) has been used for many decades as a source of oxygen for the combustion of hydrocarbon fuels and for generating steam and other gases used to propel rockets. Additionally, it was successfully used as an oxygen source in submarines as early as the 1930s. Hydrogen peroxide, available as a relatively safe fluid represents a hydrogen and oxygen-rich source of fuel for a fuel cell power system if an efficient means of separating and delivering these molecular components to the fuel cell stack can be produced. Thus, there is a need for a simpler, less costly hydrogen and oxygen supply system for a fuel cell based on hydrogen peroxide that reduces or eliminates the need for an air compressing system to support reforming needs. Preferably the system would also eliminate the cost of the expander and downsize any air system drive motor requirements.

Oxygen has been traditionally provided in the form of an air stream to the cathode side of the fuel cell stack. In all cases, there is a motive device such as a fan, blower or compressor to move the oxygen bearing air through the fuel cell stack. The power density of the stack has a direct relationship with the concentration of oxygen and hydrogen at the fuel cell membrane electrode assembly (MEA). Assuming that the production of electrical power is not limited by the hydrogen concentration on the anode side of the MEA, when the air stream is pressurized, the stack MEA can produce significantly more electrical current proportional to the density of oxygen near the membrane. Thus, the current approach to increasing the power output of fuel cells is to increase the motive power provided to the mechanical device used to move air through the fuel cell stack thereby increasing the density of the air stream. Though the total power output from the fuel cell will increase, the percentage of motive power provided to the air-moving device continually increases at a faster rate thereby reducing the overall efficiency of the system. Thus, there is a need for a method of reducing the percentage of the parasitic load to the electrical output of a fuel cell represented by these mechanical devices.

SUMMARY OF THE INVENTION

The present invention provides methods of using hydrogen peroxide to provide hydrogen and oxygen to a fuel cell. Oxygen represents 94% of the mass of each molecule of hydrogen peroxide but only 21% of the mass of air. Additionally, hydrogen peroxide is readily available as a liquid while air is supplied as a gas requiring a higher volume flow and compression to achieve the required rate of consumption in a reformer. Thus, by using an oxidizer such as hydrogen peroxide mixed with water, and hydrocarbons such as ethanol, methanol, methane, or the like in the presence of a catalyst, $CO_2$ and $H_2$ gases are produced. In PEM fuel cell stacks $CO_2$ is non-poisonous and contributes to the pressure of the fuel delivery side of the stack, while $H_2$ is the desired gas for the production of electrical power. Additionally, in the presence of a catalyst, hydrogen peroxide will degenerate to form oxygen and water. These separate reactions of hydrogen peroxide can be used to produce streams of hydrogen and oxygen for use in a fuel cell power system (FCPS).

Even when simple hydrocarbons such as methane, methanol, and ethanol are used in hypergolic reactions of hydrogen peroxide and hydrocarbons there may be some quantity of carbon monoxide (CO) present which is poisonous to PEM fuel cells. With more complex hydrocarbons such as gasoline and diesel there are other molecules and compounds produced that are poisonous to most fuel cells including sulfur and sulfur containing compounds. A common characteristic of all of these deleterious molecules is that they are considerably larger than the hydrogen molecule required by the anode side of the MEA to generate electricity. In addition to these poisonous products, elevated temperature and pressure are generated in the hypergolic reactions of hydrogen peroxide and a hydrocarbon. This elevated pressure, which is not a parasitic load on the Fuel Cell Power System (FCPS), can be used to drive hydrogen across a molecular sieve. In this way, the mixed fuel gas stream that is emitted from hypergolic reactions of hydrogen peroxide and hydrocarbons is selectively filtered across a hydrogen sieve while the rest of the molecules are discarded with no adverse effects. The carbon monoxide that does not cross the sieve can be treated with an oxidant for conversion to carbon dioxide.

In addition to hydrogen, PEM fuel cells require oxygen to create an electrical current. The oxygen is typically supplied by blowing an air stream over the cathode of the fuel cell. Unfortunately, the mechanical devices used to move the air over the cathode represent a parasitic load to the electrical output of fuel cell thereby reducing the efficiency of the fuel cell power supply. Therefore, in another embodiment of the present invention, hydrogen peroxide is catalytically or thermally reacted to provide $H_2O$ vapor and $O_2$. When this gaseous stream is introduced into the cathode (air) side of the fuel cell, the percent concentration of oxygen is increased with no corresponding increase in the parasitic power demand made by the air-moving device. This use of $H_2O_2$ as an oxygen source may be continuous, intermittent or limited to specific instances when peak power output demands or high transient loads are placed upon the FCPS.

A supplemental oxygen supply, unassociated with the parasitic power demand of a fuel cell air moving device, allows the cathode side of the fuel cell stack to have an elevated oxygen density, more importantly a higher percent $O_2$ concentration, therefore an immediately increased electrical power density of the FCPS without any corresponding increase in parasitic air system loads. This can be accomplished without increasing the pressure of the stack. If, however, there are restrictions on the quantity of $H_2O_2$ available for decomposition into $H_2O$ and $O_2$, there is still a significant benefit to the Fuel Cell Power System (FCPS) with this approach since the same electrical power densities of the stack can be intermittently reached and maintained at dramatically lower peak stack pressures. For example, identical FCPS electrical outputs can be obtained with either a high pressure approach at about 2.5 bar to about 3.0 bar or easily matched with modest $H_2O_2$ injection between about 1.3 bar to about 1.5 bar. The difference in cost and system complexity between a FCPS air delivery system capable of delivering 2.0 bar and 1.3 bar is very dramatic. The system cost difference can easily be greater than 15 to 1. This cost difference is accomplished not only with the use of a significantly lower cost compressor, but from the much smaller power demand required by the device due to reduced maximum pressures. Consequently the motive device used to operate the air moving device, which is typically an electric motor and controller, can now be downsized resulting in substantial cost savings. Another obvious benefit to pressure reduction in a FCPS is the reduced structural load placed upon the fuel cell stack itself. This in turn reduces the relative difficulty in sealing the anode and cathode gas flow passageways from one another and from leakage to the outside. Another benefit of lower pressure stacks is the reduced strain on the MEA, both from the peak pressure as well as from the reduction in the absolute value of the pressure change across the MEA experienced during transient load operation.

In other embodiments of the present invention excess hydrogen generated by the hypergolic reaction with hydrogen peroxide can be drawn off for other known uses of hydrogen gas. For example, the hydrogen gas produced in the present system can be used to power an internal combustion engine. The hydrogen is sieved from the reaction vessel and either contained in the storage vessel or delivered directly to the engine. The hydrogen feed stream can be injected into the combustion chambers of the engine along with ambient air in a normally aspirated mode or in a turbo-charged mode. The ignition of the combustion gases results in rapid expansion of the gasses formed driving the pistons in a normal manner.

Similarly, the high temperature and high pressure gases produced in the systems of the present invention can be expanded through a turbine for use as a motive source. Alternatively, the hydrogen feed stream can be mixed with air or another oxygen source and combusted in the turbine to generate power. In these instances, there is no need to remove $CO_2$ by-products as they contribute to the energy generated.

The pressurized hydrogen may also be used for enriching methane (compressed natural gas) resulting in a product known as Hythane. This process results in large quantities of $CO_2$ and when the process is performed on a stationary or transportable basis, the $CO_2$ may be captured for use in fire extinguishers, or for combination with argon gas to provide a gas blanket shield for welding purposes. When stored under pressure, it can be used to chill or freeze objects.

There are also some applications in which power generation is required in enclosed environments where access to a replenishing stream of air is restricted, such as underground mining or enclosed warehouses. For these applications, and in particular where the safety of people within these enclosed environments impose additional constraints to power generation, an oxygen source other than air is needed for a fuel cell powering system (FCPS). Use of $H_2O_2$ in these situations avoids the depletion of oxygen in the local environment and with appropriate consideration of the fuel type that is oxidized, reduces the formation of oxides of carbon and sulfur, and eliminates those of nitrogen in the exhaust gas stream. Thus, in another embodiment of the present invention, hydrogen peroxide is used as the sole source of oxygen to the cathode of a fuel cell to generate power in the absence of a continuous air supply.

DETAILED DESCRIPTION OF THE INVENTION

The present invention takes advantage of the hypergolic reactive nature of concentrated hydrogen peroxide when combined with hydrocarbon fuels in an appropriate stoichiometric ratio to produce carbon dioxide and hydrogen. By combining the fuels in a pressure vessel containing a catalyst that encourages the formation of $CO_2$, hydrogen gas is formed which can then be used to power a fuel cell.

If simple hydrocarbons such as methane, methanol, or ethanol are combined with $H_2O_2$ in the absence of air, the respective chemical reactions are:

$$H_2O_2 + CH_4O \rightarrow CO_2 + 3H_2 \quad \text{(Reaction 1)}$$

$$H_2O_2 + 2CH_3OH \rightarrow 2CO_2 + 5H_2 \quad \text{(Reaction 2)}$$

$$H_2O_2 + C_2H_5OH + H_2O \rightarrow 2CO_2 + 5H_2 \quad \text{(Reaction 3)}$$

As shown in Reaction 3, if water is added to the ethanol/$H_2O_2$ reaction, the yield is the same as the methanol/$H_2O_2$ reaction. Because ethanol is miscible with water, and readily available as a liquid, it is the preferred hydrocarbon source for the methods of the present invention, although one of skill in the art will readily appreciate that other hydrocarbon fuels can be used in these reactions with only small adjustments to achieve the desired hydrogen production for use in a fuel cell. In a mixture of less than about 65% $H_2O_2$ in water, the $H_2O_2$ will still be hypergolic when mixed with hydrocarbons. Thus, ethanol mixed with the $H_2O_2$ in water will react as shown in Reaction 3 to produce hydrogen and carbon dioxide. Heat is generated in these reactions resulting in elevated pressure and temperature within the fixed volume of a reaction vessel.

Preferably, the hypergolic reactants are injected into the reaction vessel in microgram quantities and initially occupy only sub-milliliter size volumes. In this way, the heat generated by the reactions elevates the reaction vessel temperature and pressure. Because the gases produced in the reaction do not have to be used immediately, they can remain in the reaction vessel for longer periods of time thereby reducing incomplete reactions as additional $H_2$ and $CO_2$ are formed in the presence of catalysts. The simultaneous injection of the liquids under pressure results in droplet formation or vaporization, as a function of nozzle design. Alternatively, the injection timing of the different liquids can be adjusted under system control to allow for the peroxide to begin dissociation before injection of the hydrocarbon.

The use of $H_2O_2$ avoids the problems of using air to supply the oxygen, along with the associated need for a compressor to pressurize the air to the level needed for reforming (as much as 3.2 bar) as well as a large gas cleanup system needed post reformation. The elimination of these mechanical requirements reduces the fuel cell air system size requirements by approximately 25% lowering the overall cost of that subsystem. Additionally, the creation of $CO_2$ in the gas stream produced by the reaction of $H_2O_2$ and a hydrocarbon is not typically viewed as harmful/poisonous to the PEM fuel cell membranes.

The separate volumes of ethanol and the $H_2O_2$/water mixture may be set approximately equal to the conventional gasoline tank volume carried by most current automobiles to achieve the same driving range.

Figure 1:
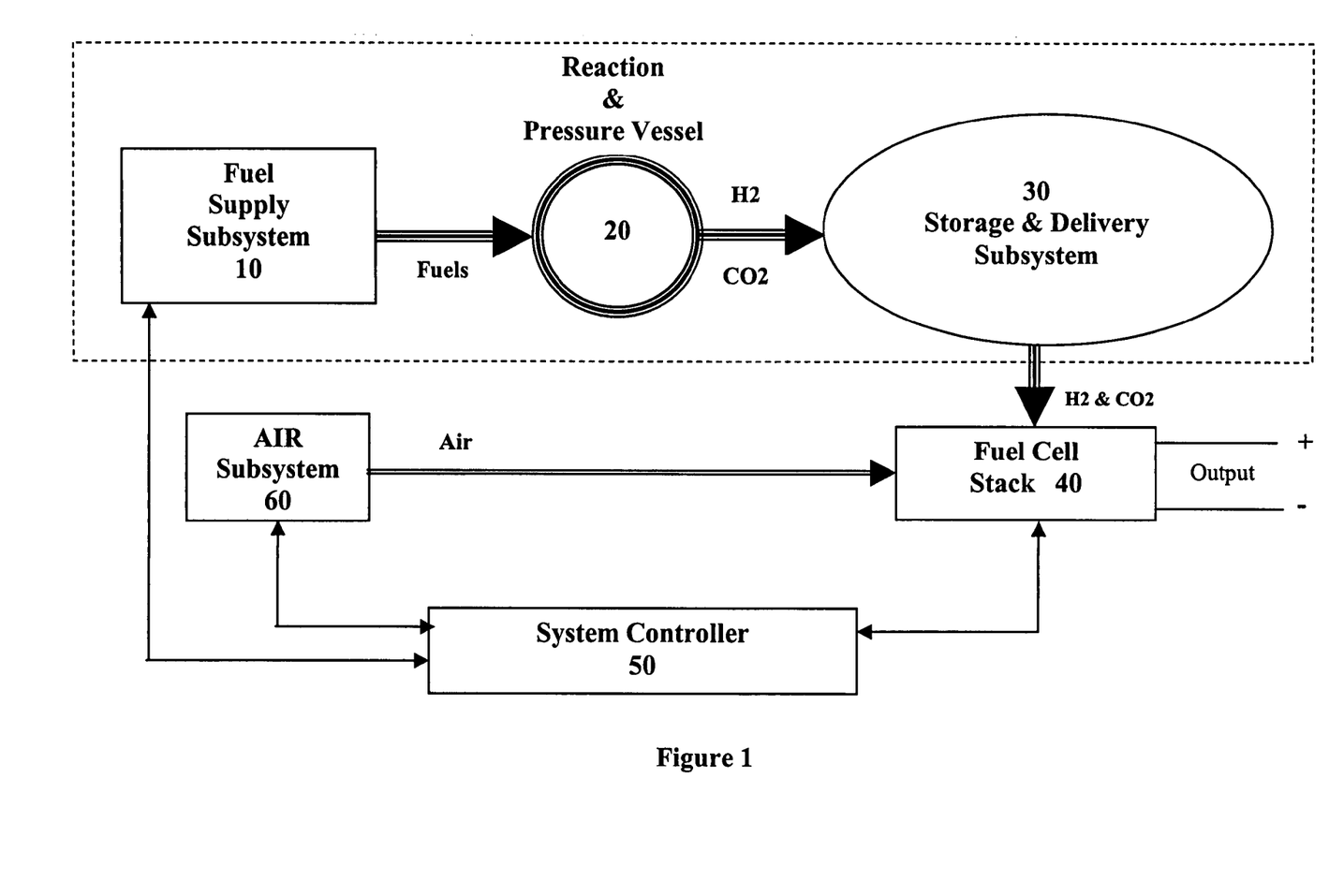
FIG. 1 is a block diagram of a Fuel Cell Power System incorporating a basic hypergolic hydrogen generation system as the hydrogen source.

Referring to FIG. 1, the Fuel Cell Power System (FCPS) of the present invention includes a hypergolic hydrogen generating system divided into three basic subsystems. These include a Fuel Supply subsystem (10), at least one Reaction/Pressure Vessel (20) and Storage and Delivery subsystem (30).

Figure 2:
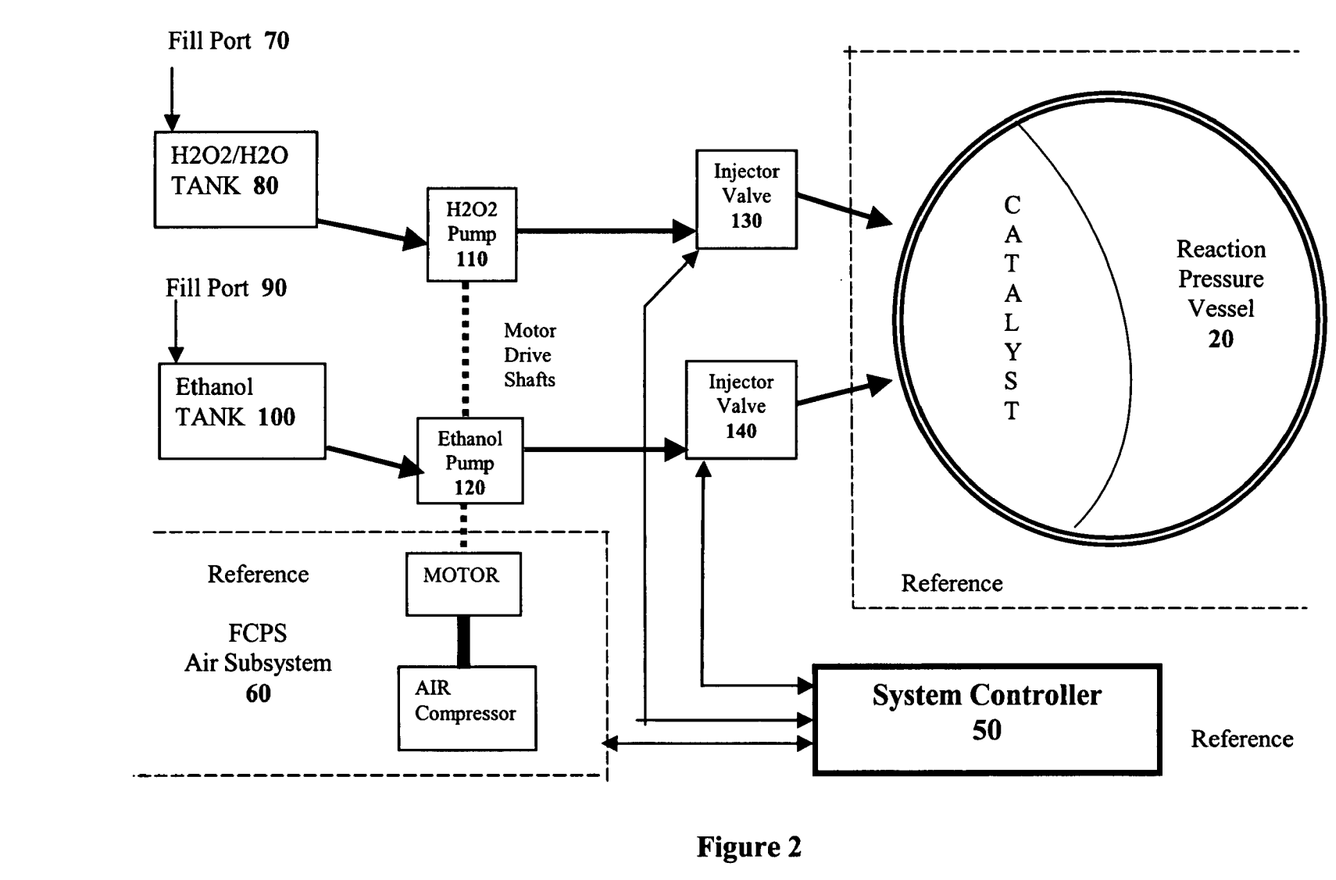
FIG. 2 is an expanded diagram of the Fuel Supply subsystem showing the interfacing parts of the Fuel Cell Power System.

Referring to FIG. 2, the Fuel Supply subsystem (10) provides a mixture of hydrogen peroxide and water ($H_2O_2$/$H_2O$) and a separate supply of a hydrocarbon fuel. The $H_2O_2$/$H_2O$ mixture is supplied to the $H_2O_2$/$H_2O$ tank (80) as a liquid through the fill port (70). The $H_2O_2$/$H_2O$ mixture is between about 40% and about 70% hydrogen peroxide by weight. Preferably in reacting with ethanol, the $H_2O_2$/$H_2O$ mixture is between about 62% and about 68% hydrogen peroxide by weight. Similarly, the hydrocarbon fuel is supplied to the fuel tank (100) through the fill port (90). Depending upon the hydrocarbon fuel used, the fuel is supplied as a liquid or a gas. The hydrocarbon fuel can contain any hydrocarbon that will participate in a hypergolic reaction with the $H_2O_2$/$H_2O$ mixture. The fuel may be any compound, produced or manufactured to transport hydrogen, in which the carrier molecules require oxidation to release the hydrogen for subsequent use. Preferably, the fuel is a liquid. Examples of suitable hydrocarbon fuels for use in the present invention include methane, methanol, ethane, ethanol, butane and butanol or mixtures of these chemicals though one of skill in the art will readily appreciate that numerous hydrocarbons will participate in the hypergolic reactions of the present invention to form hydrogen gas suitable for use in a fuel cell. Preferably, the hydrocarbon fuel is methane, methanol or ethanol. Most preferably, the hydrocarbon fuel is liquid ethanol.

The $H_2O_2$/$H_2O$ mixture and the hydrocarbon fuel are pumped to the Reaction Pressure Vessel (20) by pumps (110 and 120) through at least one injector valve (130 and 140) for each liquid or gas component under control of the System Controller (50). The oxidizer and fuel are, or can be pumped using a shaft, if required, from an Air subsystem (60) driveline or an independent motor. The oxidizer and fuel are injected into the Reactor/Pressure Vessel (20) that contains an appropriate catalyst. The catalyst can be any compound that encourages the formation of carbon dioxide and hydrogen from the reactants. Suitable catalysts include iron, nickel, cobalt, copper, chromium, platinum and mixtures of these catalysts.

The fact that the hydrogen does not immediately have to be delivered from the Reaction/Pressure Vessel (20) to the Storage and Delivery subsystem (30) allows the injected liquids to react in hypergolic fashion and under the dynamics of molecular motion in the presence of a catalyst. After many micro-injections of the fuels, the pressure builds up in the Reaction and Pressure Vessel (20). The gases formed are admitted into the Storage and Delivery subsystem (30) as needed in accordance with an algorithm stored in the System Controller (50). This output can also be used directly from the reaction vessels depending upon the particular application. The Storage and Delivery subsystem (30) may have a larger volume than the Reaction/Pressure Vessel and be of sufficient size to allow for the delivery of sufficient hydrogen to support the power output from the Fuel Cell Stack (40). This second vessel allows for longer transit time in the Reaction and Pressure Vessel to enable more complete formation of $CO_2$ rather than CO. In the embodiment in which a second pressure vessel is used that is larger than the first Reaction and Pressure Vessel, the hydrogen and carbon dioxide gas products will be cooled as they expand into the larger vessel. If the resulting temperature change should be insufficient however, the desired temperature may be achieved through the use of an optional heat exchanger (170) installed in the delivery line. This optional heat exchanger may also take the form of a heat exchange jacket around the Reaction and Pressure Vessel (20) or the delivery line from the Reaction and Pressure Vessel (20) to the Storage and Delivery subsystem (30).

PEM fuel cells currently require that the internal operational temperature of the gases, both anode and cathode, be below 100° C. For this reason, 80° C. is the frequent maximum temperature allowed by FCPS developers. The elevated gas temperatures generated from the exothermic disassociation of peroxide and follow on oxidation of the hydrocarbon fuel can be easily handled by utilizing the energies of these reactions. In an appropriately sized reaction vessel volume, the pressure of the product gases can be driven to a calculated value based upon the gas temperature, heat exchanger temperature, coolant temperature and the known thermal mass of the system such that after heat transfer and pressure drop(s) to ambient or an elevated stack anode pressure, the temperature of the humidified hydrogen fuel stream is compatible with the maximum allowed values. Preferably, the temperature of the gases delivered to the fuel cell stack is between about 10° C. and about 85° C. The recharging of the Storage and Delivery Subsystem vessel from the Reaction/Pressure Vessel (20) will start when a specified design point for recharging is detected by a sensor (160) under control by the system controller (50). As noted above, the output from the Storage and Delivery subsystem (30) is under the control of a programmable or command compatible pressure regulator (200) coupled with an output valve (210), which acts to control the pressure and flow of gas into the fuel cell stack (40). This flow can be either continuous or pulsed as a function of the pulse width command from the System Controller (50).

The function of the Fuel Supply subsystem is to provide fuels that react in hypergolic fashion when combined in the Reaction Pressure Vessel (20). Referring to FIG. 2, this is accomplished through the use of at least two separate fuel tanks (80 and 100). The individual fuels are pumped to a pressure level that can be handled by injector valves (130 and 140) leading to the Reaction Pressure Vessel (20). Preferably, regulated return lines to the tank are included to keep the fuel pumps (110 and 120) from overheating. The valves (130 and 140) shown in FIG. 2 represent the minimum number feasible for a functional operating system. Optionally, the system may have as many valves as needed to meet the requirements of the overall system design. In a preferred embodiment, the fuel pumps (110 and 120) are independently driven by individual motors or by a shaft extension from the air subsystem drive motor. This configuration is well suited to an automobile because the Air subsystem motor is required by the FCPS and the load imposed by the additional pumps for supplying fuel is relatively minor compared to driving the air compressor. Even with the reduction of power afforded to the Air subsystem needs by the present invention, the Air subsystem will still be the largest parasitic load on the FCPS.

The valves in the Fuel Supply subsystem (130 and 140) are high speed micro-injector valves that allow the System Controller (50) to pulse inject the hypergolic reactants into the Reaction Pressure vessel (20). This allows the System Controller (50) to determine the rate of buildup of pressure and temperature internal to this vessel and use a pulse width modulation approach for controlling the "on" time of the delivery pulse from each of the valves (130 and 140), thereby providing very tight metering of fuel delivery. This tight control also allows for delivery variations between each of the fuel reactants as may be needed to achieve different mixtures between the fuel reactants in accord with the needs of the FCPS relative to stoichiometric needs.

The $H_2O_2/H_2O$ mixture is stored in a tank composed of, or at least lined with, a material that is non-reactive with $H_2O_2$. Preferably, PTFE is the tank or tank liner material. Similarly, the hydrocarbon fuel tank materials must not react with the hydrocarbon fuel. There are many compatible coatings for this type of hydrocarbon fuel tank known in the art such as galvanized steel or plastics such as Teflon®. The fuel tanks (80 and 100) have fill ports (70 and 90) that can accommodate filling nozzles for the desired fuel mixture. The tank outputs are pumped up to a pressure that allows the injectors to mist the reactants into the Reaction and Pressure Vessel (20). By mist injecting the fuels into the Reforming Pressure Vessel (20), the number of hydrocarbon molecules colliding with the disassociated $H_2O_2$ molecules within a given time is increased producing a faster reaction.

Figure 3:
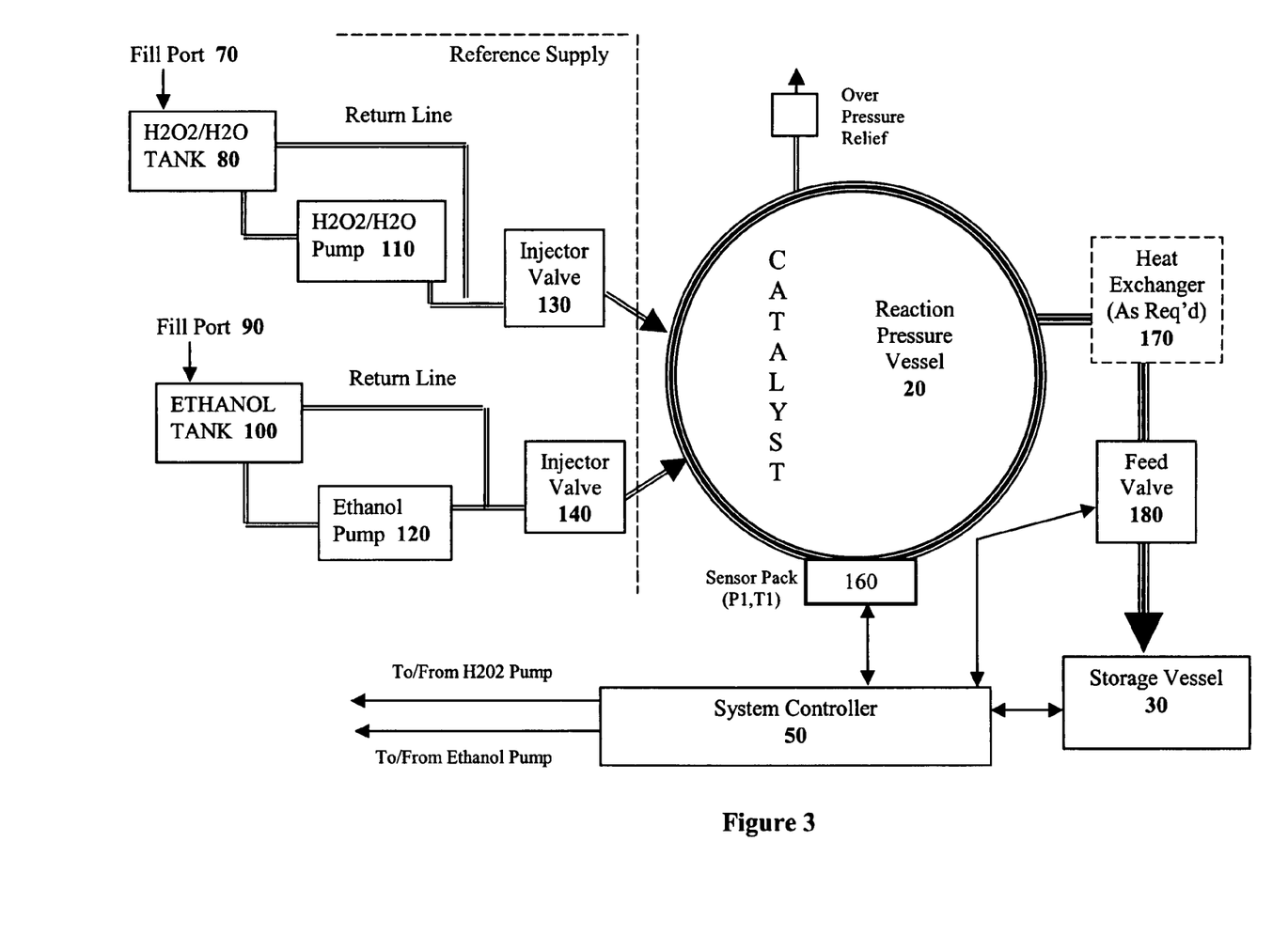
FIG. 3 is a schematic of a Reaction/Pressure Vessel suitable for use in the fuel cell power systems of the present invention.

Referring to FIG. 3, the Reactor/Pressure Vessel (20) is a high-pressure vessel containing a catalyst chosen to facilitate the formation of carbon dioxide and hydrogen from the injected reactants. Because the reaction is hypergolic, the reactants increase in both temperature and pressure, the Reaction and Pressure vessel (20) is provided with an over pressure relief system (150), which will safely vent the internal pressure in an instance of system run away. The Reaction and Pressure vessel (20) also has a sensor (160) of pressure and temperature inside the Reaction and Pressure vessel (20) for use by the System Controller (50). Incorporating these pressure and temperature values with the state of other subsystems in the FCPS system, commands are given to control the inlet of the reactants or to open a valve (180) controlling gas flow from the Reaction and Pressure vessel (20) to the Storage and Delivery subsystem. This input to the Storage and Delivery subsystem (30) continues until the desired storage pressure in the Storage and Delivery subsystem vessel is attained. Depending upon the size of the FCPS system, a heat exchange system (170) may be required between the Reaction and Pressure vessel (20) and the Storage and Delivery subsystem (30). Alternatively, a heat exchange system may be provided integral with the Reaction and Pressure vessel itself.

Figure 4:
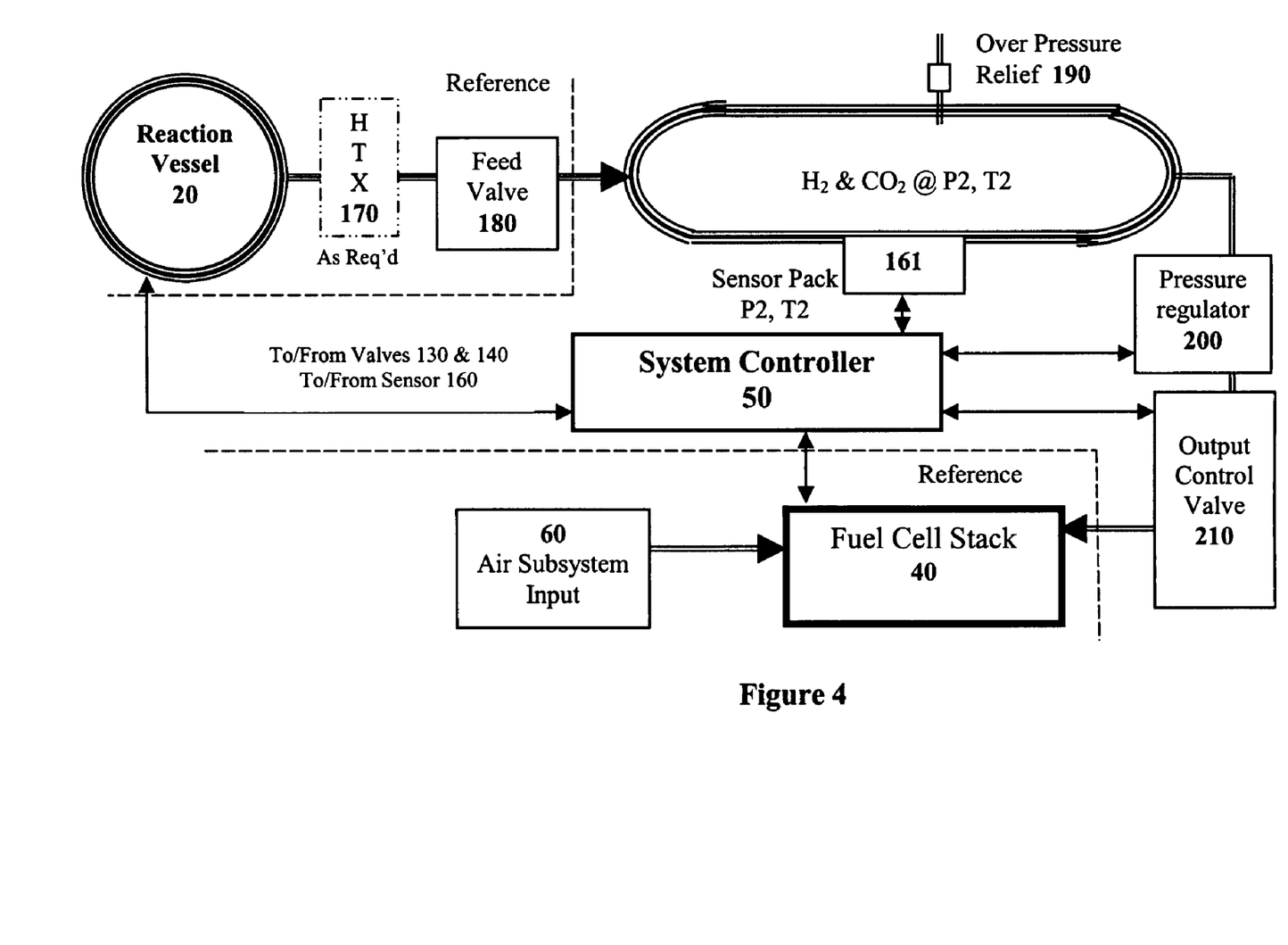
FIG. 4 is a diagram of a Storage and Delivery subsystem of the present invention.

Referring to FIG. 4, Storage and Delivery subsystem (30) includes a storage vessel that is larger than the Reaction and Pressure vessel (20) for the purposes of allowing the hydrogen and carbon dioxide gases to cool as they expand into the larger vessel. The Storage and Delivery subsystem (30) also operates at a lower pressure to reduce the required range over which the pressure regulator (200) must operate since the input maximum pressure requirement to the fuel cell stack (40) only needs to balance the air pressure across the membrane. This pressure varies in most contemporary fuel cell designs from a pressure ratio from ambient air to about 2.2. The pressure in the Storage and Delivery subsystem tank could be 2,000 psi or higher and therefore this tank is also provided with an over pressure relief system (190). Similarly, this tank is provided with a sensor (220) to monitor pressure and temperature for the System Controller (50). The pressure regulator (220) is programmable by the System Controller (50) as a function of the pressure needed to affect the best fuel cell stack output (voltage and current) based upon the load on the FCPS System.

In the hypergolic reactions of the present invention some quantity of carbon monoxide is produced by the incomplete reaction of the reactants. This carbon monoxide is poisonous to PEM fuel cells. When more complex hydrocarbons such as gasoline, diesel, DME, JP5 and JP8 are used in the reactions, there are other molecules and compounds contaminating the fuel such as sulfur, that are poisonous to most fuel cells. These deleterious molecules are larger than hydrogen and therefore, may be filtered from the hydrogen prior to delivery to the fuel cell stack.

There are fuel cells, such as solid oxide, in which CO is benign to the membranes. The processes of the present invention are well suited for use with fuel cells in which the $H_2$, and $CO_2$, along with some quantity of CO represent a viable fuel. While the presence of CO in the product stream implies that reaction of the proposed fuels and $H_2O_2$ is incomplete and thereby would have lower hydrogen conversion efficiency, full or very high levels of conversion may be unwarranted for some fuel cell applications in which CO is not a contaminate. Since full conversion of CO to $CO_2$ is not necessarily required, some expense can be avoided although full conversion is preferred for best efficiency.

When CO is poisonous to the fuel cell used, the elevated temperature and pressure generated as a component of the reaction products of the hypergolic reactions of $H_2O_2$ with a hydrocarbon fuel can be used advantageously. The elevated pressure, which is not a parasitic load on the FCPS, can be used to drive hydrogen across a molecular sieve. Thus, in another embodiment of the present invention, a molecular sieve is used to remove other molecules and compounds from the hydrogen stream generated in the hypergolic reactions of the present invention.

Figure 7:
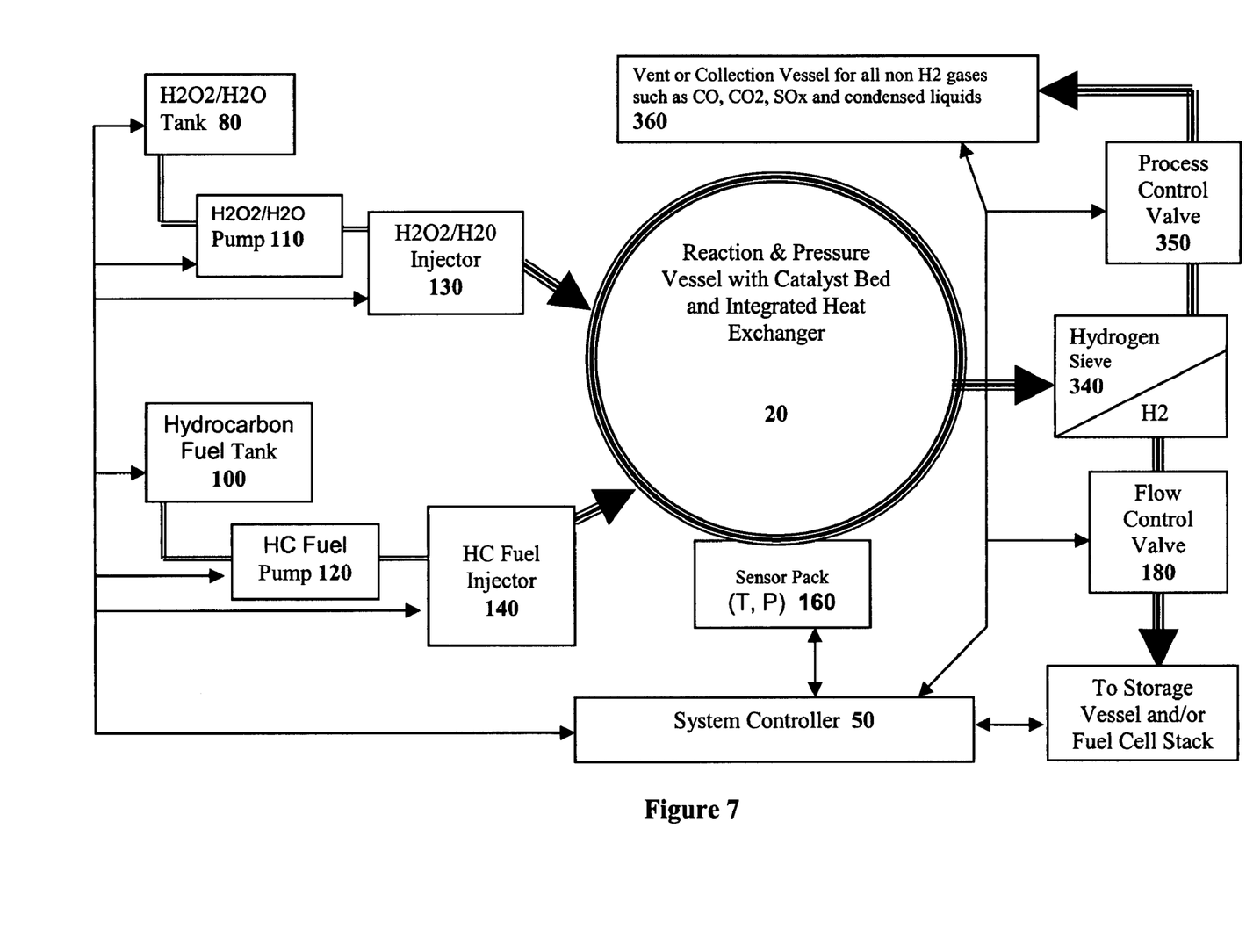
FIG. 7 is a diagram of a fuel cell power system in which hydrogen generated from hydrogen peroxide is passed through a hydrogen sieve before reaching the fuel cell.

Referring to FIG. 7, the use of a hydrogen sieve (340) is accomplished by inserting the sieve in the system described above into the gas flow from the Reaction and Pressure Vessel (20). The system may optionally incorporate a hydrogen compatible pump on the low pressure side of the sieve in order to facilitate the transfer of hydrogen past the sieve. Suitable hydrogen sieves are known in the art including dense ceramic proton conducting membranes or ceramic membranes with micro-porosity. In order to transfer the maximum quantity of hydrogen for any amount of hypergolic reactants, the process may be performed in batch mode. If batch mode is used, it may necessitate a larger storage vessel for hydrogen in order to ensure sufficient fuel supply to meet FCPS needs (as the next batch of hydrogen gas is processed). Batch mode will however, minimize the parasitic power demand on the FCPS by the hydrogen pump because the pressure drop across the hydrogen sieve membrane is dramatically reduced from multiple bars to less than about 0.5 bar. The greater the pressure drop, the faster the fuel batch can be processed. The hydrogen fuel pump can be configured to operate at a nominally low pressure change across the sieve for the majority of the FCPS duty cycle, thereby minimizing parasitic power consumption. Alternatively, under high load conditions, the hydrogen pump can dramatically increase the pressure change across the membrane to reduce the batch mode processing time to ensure a sufficient hydrogen fuel stream to the FCPS. This process minimizes the size of the second hydrogen storage vessel, which may be important for some applications.

In this embodiment, the flow of hydrogen gas from the hydrogen sieve (340) to a storage vessel or directly to the fuel cell stack is metered through the flow control valve (180) under the control of the System Controller (50). The gas stream that does not pass through the hydrogen sieve passes to a vent or collection vessel (360) for possible condensation of the water vapor and/or discard, which would be controlled by the System Controller (50). Condensed water may be collected and reprocessed to be made available for humidification of gases flowing to the fuel cell stacks as required by the FCPS. Filtration, reverse osmosis or similar means can be used to reprocess the collected water for use in this humidification step. This water flow may be metered through a process control valve (350) under the control of the System Controller (50).

The molecular sieve greatly diminishes the need to have very high conversion rates of CO to $CO_2$, since CO will not pass through the sieve to the CO sensitive MEA. Such a high degree of conversion may prove to require features that would be adverse to the desire of automobile companies to have power systems that are small, inexpensive and with fast response capability. Furthermore, a pure hydrogen gas stream has many advantages with improving power densities of the FCPS along with its ability to respond to high transient load conditions. Because only hydrogen is present in the fuel stream, there will be a very high concentration of hydrogen in the near vicinity of the anode side of the MEA. In addition, because no large molecules, inert or otherwise, are present in the fuel stream, there is considerably less pressure drop, and therefore less energy required in transporting new fuel to replenish all areas of the MEA as high electrical loads are experienced by the FCPS. With such high concentrations of hydrogen in the vicinity of the anode side of the MEA, the maximum operating pressure needed by the fuel cell stack is reduced for the identical level of electrical production obtained by a higher pressure system. In particular, if a supplemental oxygen supply is available to increase the concentration of $O_2$ in the near vicinity of the cathode side of the MEA without an increase in pressure, there is additional reduction in the maximum stack pressure, thereby reducing the structural design requirements of the stack as well as facilitating the demanding requirements of sealing the anode and cathode gas streams from leakage.

The System Controller (50) plays a critical role in providing the greatest degree of functionality of the hydrogen generating system with regards to the operational requirements of the overall Fuel Cell Power System (FCPS). The mathematical algorithms and look up data tables programmed into the controller allow the hydrogen generating system to adjust key gas parameters at each stage of the process to better match the FCPS hydrogen demands. For example, the ability to independently microinject the reactants allows for variable, non-stochiometric, ratios of oxidizer and the hydrocarbon fuel to be present in the primary oxidation catalytic bed. As such, an increased oxygen level, obtained by an increase of the microinjection rate of hydrogen peroxide, would allow for enhanced CO to $CO_2$ conversion during startup or other times that catalytic gas cleanup beds within the hydrogen generating system are not up to the required minimum operating temperatures. When a carbon monoxide detecting sensor is integrated into the sensor package at (160) and/or (161), or elsewhere in the hydrogen generating system, the System Controller (50) would be able to actively adjust the injection rate of the oxidizer injector (130) to facilitate the conversion of CO to $CO_2$ by adding excess oxygen. Furthermore, alternative oxidizer injection sites may be used other than in the primary Reaction Pressure Vessel. Preferably there is an oxidizer injection site located in the Storage Vessel (30) or its functional equivalent. This injector can also be controlled by the System Controller (50).

The relative sizes of the primary components of the hydrogen generating system (Reaction Pressure Vessel (20), Heat Exchanger (170), Hydrogen Sieve (340) and the Storage Vessel (30)) are very much defined by the particular application and duty cycle of that application. The relative temperature and pressure at each of the process points can be used as independent variables available to the System Controller (50) to meet the specific, transient fueling demands of the FCPS. As such, the maximum pressure range of the Reaction and Pressure Vessel is preferably between about 1000 psi and about 5000 psi, though minimum and maximum pressures outside of this range are entirely possible. A 5000-psi pressure reflects the FCPS requirement of minimized package volume, or a densely packed catalytic bed with high pressure drops, or the need to drive the product gases through a high pressure drop hydrogen sieve. As the maximum pressure of the Reaction Pressure Vessel (20) decreases, there will be a tendency for its volume to increase. A primary driver of this relationship is the continuing need to process sufficient reactants to meet the FCPS's duty cycle. An alternative tradeoff that can be made in order to avoid increasing the Reaction Pressure Vessel (20) volume (and therefore the associated thermal mass and expense of added catalysts) is an increase to the stored hydrogen capacity or by increasing the storage pressure of the processed hydrogen feed stream. As such, the maximum pressure of the hydrogen feed stream upstream of the Pressure Regulator Valve (200) is between about 500 psi and about 1500 psi.

Simple increases in the overall storage volume are accomplished by selecting larger diameter gas transfer piping. It is possible to eliminate the Storage Vessel (30) structure, yet retain its functionality by providing a means to isolate the volumes of the Hydrogen Sieve (340), if present, and the Heat Exchanger (170), if present, from the Reaction Pressure Vessel (20). That volume accomplishes the storage functionality assigned to the Storage Vessel (30).

Thermal control of the gases is another functionality that may be performed by the System Controller (50). If the hydrogen feed stream generated by this device is to be used by a PEM type fuel cell, the maximum gas temperature entering the PEM fuel cell must be between about 10° C. and about 85° C. The System Controller monitors the injection rates, temperature and pressure, and based upon the PEM FCPS requirements of hydrogen gas in this temperature range and a humidified hydrogen feed stream, actively controls and adjusts the thermal transfer rates of both the internal heat exchange system of the Reaction Pressure Vessel (20) and the external Heat Exchanger (170), if present. The System Controller (50) is able, within limits of gas and water vapor properties, to independently modify the maximum/minimum pressures at each stage of the process in order to use both active heat exchange capabilities and the thermal loss due to the induced pressure drops to provide the precise mass flow within the necessary temperature and humidification range. A means of collecting and removing the condensate after each induced pressure drop through a pressure control valve is incorporated. Systems of this type are known to the art and are commercially available. The System Controller (50) is able to compensate for a wide range of ambient atmospheric conditions including hot or cold, humid or dry, in which a particular FCPS is anticipated to operate.

In another embodiment of the present invention hydrogen peroxide is used to supply oxygen to the cathode side of the fuel cell allowing the cathode side of the fuel cell stack to have a higher percent oxygen concentration and therefore an immediate increase in the electrical power density of the FCPS without increasing the parasitic power demand from an air-moving device. This oxygen source may be used continuously or intermittently in instances when peak power output demands or high transient loads are placed upon the FCPS.

As noted above, $H_2O_2$ is an excellent source of oxygen due to the very high weight ratio of oxygen to the rest of the molecule. It is a preferred choice because of its high oxygen concentration and relative ease of transportation and safety. An additional benefit of this reactant is the exothermic nature of the decomposition of $H_2O_2$, allowing for very fast response times from a System Controller decision to supplement the oxygen stream to the actual increased density of oxygen at the fuel cell MEA. Any alternative oxygen source with an endothermic reaction would be unlikely to meet the transient response times required for automotive or high transient power generation applications. Even with a storage strategy, an endothermic compound would be another parasitic power load upon the vehicle or power plant application. For automotive applications in particular, parasitic loads increase the size, cost, and operational complexity of the power system, thereby providing significant obstacles to the selection and integration of such parasitic devices. Thus, the use of hydrogen peroxide as an oxygen source overcomes these problems allowing increased oxygen density at the cathode of the fuel cell stack possible without the burden of an endothermic production system.

Figure 5:
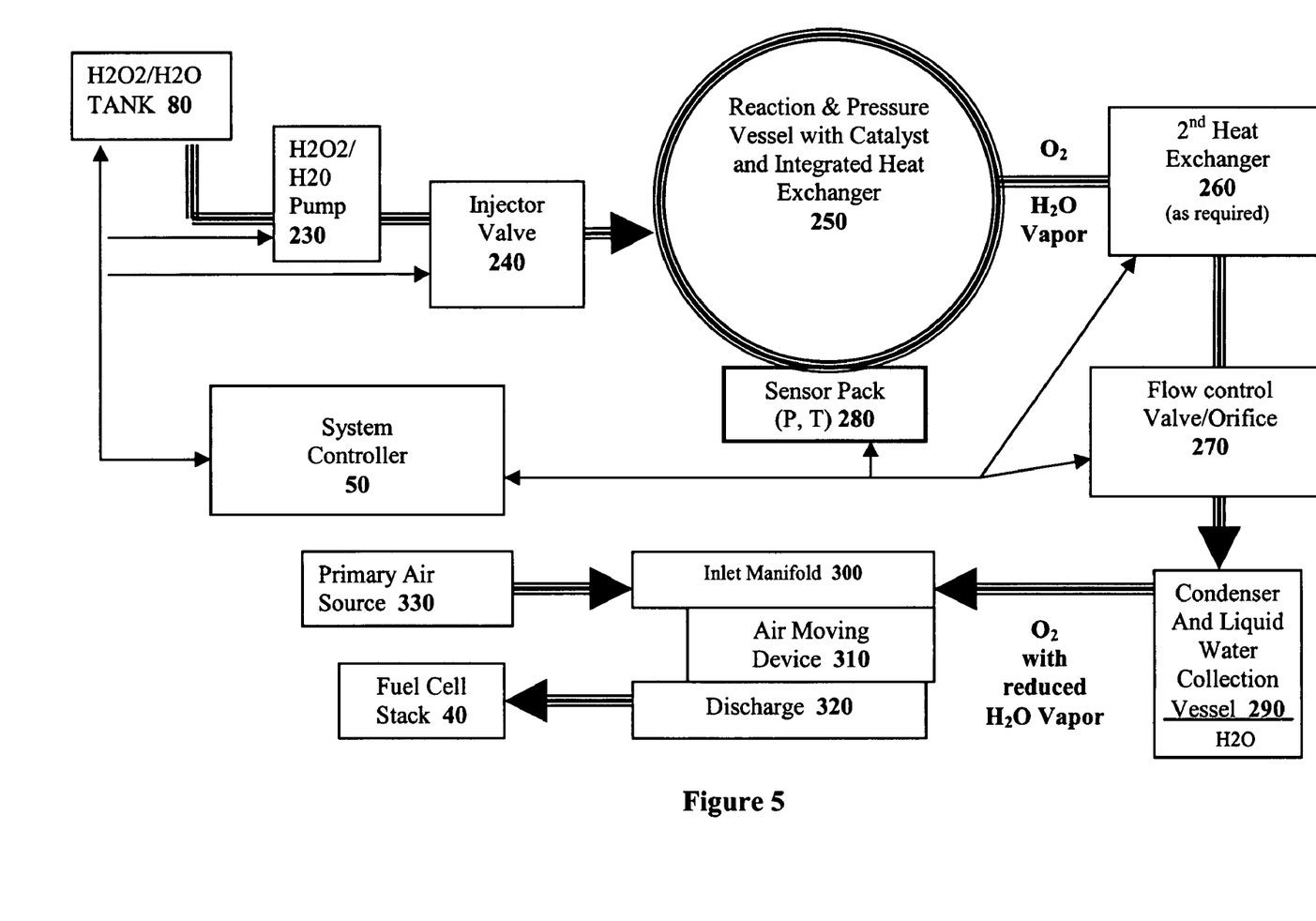
FIG. 5 is a diagram of a fuel cell power system assembly incorporating the use of hydrogen peroxide as a supplemental oxygen source.

Referring to FIG. 5, oxygen is supplied to the cathode side of the fuel cell stack (40) through a system that may integrate with the system used to produce hydrogen from a hypergolic reaction of hydrogen peroxide with hydrocarbon fuels. A hydrogen peroxide and water mixture is supplied by pump (230) from $H_2O_2/H_2O$ tank (80) to a reaction and pressure vessel (250) through an injector valve (240). Similar to the hypergolic Reaction and Pressure Vessel described above, the Reaction and Pressure Vessel (250) includes a catalyst and an integrated heat exchange system as well as a sensor (280) to monitor temperature and pressure of the reactor contents. The temperature and pressure within the reaction vessel is controllable through the microinjection rate of hydrogen peroxide. PEM fuel cells require that the inlet gases, at the anode and cathode be below 100° C. For this reason, 80-85° C. is the frequent maximum temperature allowed by FCPS developers. The elevated gas temperatures generated from the exothermic disassociation of peroxide can be easily handled by utilizing the energy of this disassociation. In an appropriately sized reaction vessel volume, the pressure of the product gases can be driven to a calculated value based upon the gas temperature, heat exchanger temperature, coolant temperature and the known thermal mass of the system such that after heat transfer and pressure drop to ambient or elevated stack pressure, the temperature of the oxygen and water vapor is compatible with not exceeding the maximum allowed value(s). The disassociation catalyst may be any compound that increases the production of oxygen and water from hydrogen peroxide in the reaction:

$$2H_2O_2 \rightarrow O_2 + 2H_2O \quad \text{(Reaction 4)}$$

Examples of useful catalysts include platinum mixed oxides, vanadium-cobalt oxides, nickel, platinum, silver packs, rhodium supported on zirconia, a mixture of ceria and zirconia, iron, nickel, chromium, and mixtures of these catalysts. If the sensor (280) indicates that the contents of the Reaction and Pressure Vessel (250) are too hot, the temperature may be cooled by the integrated heat exchanger. The temperature of the reaction products may be further cooled through the use of an optional second heat exchange system (260) outside of the Reaction and Pressure Vessel (250).

The sensor (280) is under the control of the System Controller (50), which can incorporate the pressure and temperature values from the sensor (280) with the state of other subsystems in the FCPS system to control the flow of oxygen and water vapor to the fuel cell stack (40) through a flow control valve (270).

The oxygen and water vapor produced in Reaction 4 are drawn through a condenser (290) by a compressor comprising an inlet manifold (300), a compressor (310) and a discharge manifold (320). Excess water vapor is condensed and captured in the condensor (290). The condensed water can be used as needed for other functions within the FCPS; primarily humidification of anode and cathode gas feed streams. The oxygen is mixed with air in the inlet manifold (300) of the compressor before being compressed and discharged to the fuel cell stack (40).

Figure 6:
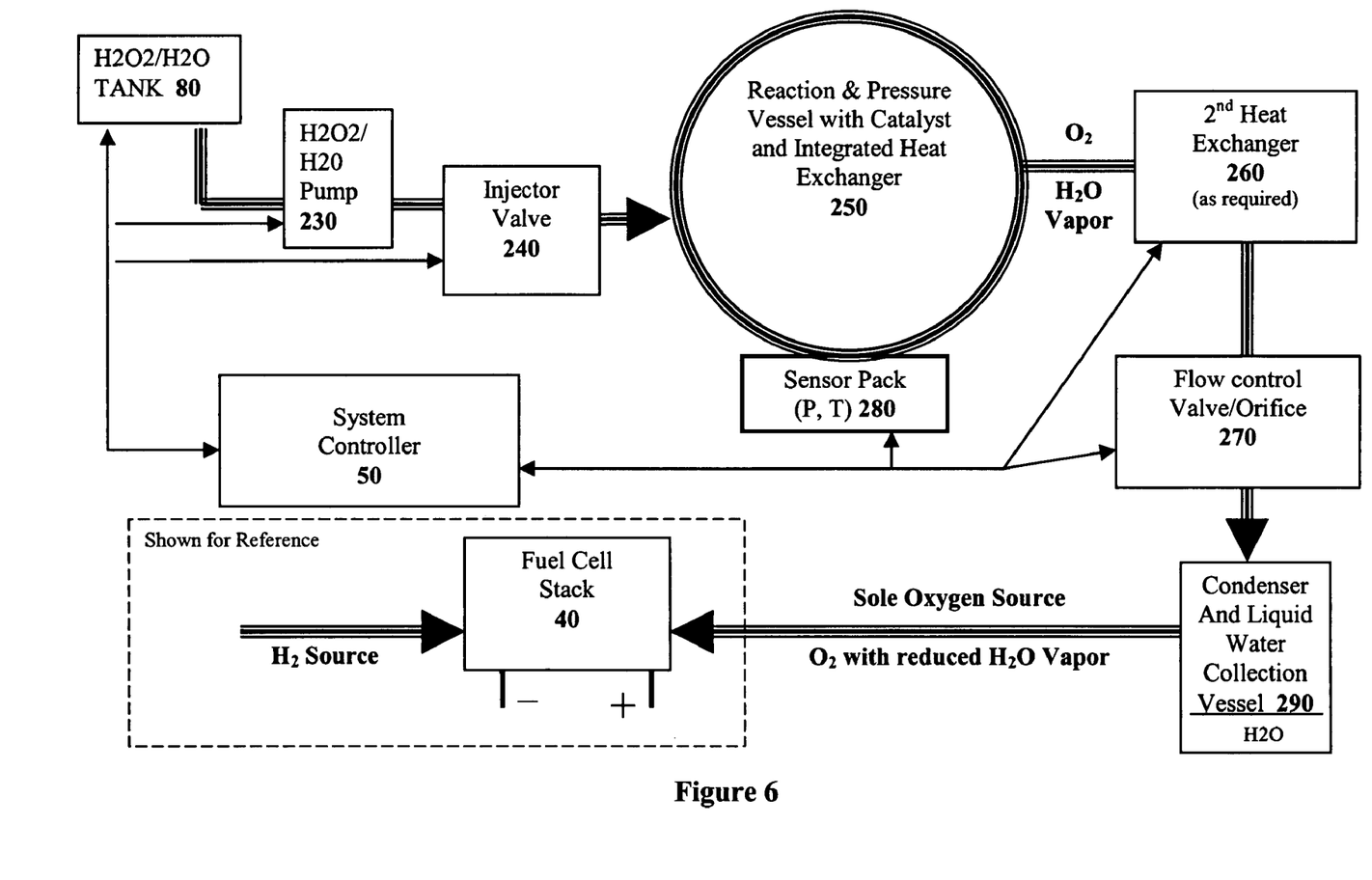
FIG. 6 is a diagram of a fuel cell power system assembly using hydrogen peroxide as an exclusive oxygen source.

In another embodiment of the present invention, the oxygen produced in Reaction 4 is used as the sole source of oxygen to the cathode of the fuel cell stack in the absence of an air stream. The mixture of hydrogen peroxide and water ($H_2O_2/H_2O$) for use in producing the oxygen to supply the cathode in the fuel cell stack is derived from the same source used in hydrogen generation. Referring to FIG. 6, oxygen is supplied to the cathode side of the fuel cell stack (40) through a system that may integrate with the system used to produce hydrogen from a hypergolic reaction of hydrogen peroxide with hydrocarbon fuels described above. In this embodiment, the hydrogen peroxide and water mixture is from H₂O₂/H₂O tank (80) to a Reaction and Pressure Vessel (250) where it reacts to create oxygen and water vapor in an identical manner to the system described above with respect to FIG. 5. In this embodiment however, after at least part of the water vapor is condensed and captured in the condensor (290), the humidified oxygen gas stream is supplied directly to the fuel cell stack (40) without being mixed with air.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method of supplying hydrogen for use in a hydrogen fueled, power generation system comprising:
    micro-injecting a mixture of hydrogen peroxide and water into a reaction vessel containing a catalyst that encourages the formation of carbon dioxide and hydrogen;
    micro-injecting a hydrocarbon into the reaction vessel wherein the hydrogen peroxide and hydrocarbon react in the presence of the catalyst to produce hydrogen and carbon dioxide gases, which raises the pressure within the reaction vessel to a pressure sufficient to drive gases from the reaction vessel to the power generation system;
    directing hydrogen gas from the reaction vessel to a storage volume; and,
    supplying the hydrogen gas in the storage volume to a power generation system
    wherein, the movement of gases from the reaction vessel to the storage volume and from the storage volume to the power generation system is under the control of a system controller.

2. The method of claim 1, wherein the catalyst is at least one chemical selected from the group consisting of iron, nickel, cobalt, copper, chromium and platinum.

3. The method of claim 1, wherein gases from the reaction vessel are driven over a molecular sieve to form a product gas stream enriched in hydrogen gas.

4. The method of claim 1, wherein the micro-injection of both the hydrogen peroxide and water mixture and the hydrocarbon comprises pumping each liquid from an ambient pressure vessel through at least one pressurized injector valve for each liquid into the reaction vessel.

5. The method of claim 1, wherein pulse duration and frequency of the micro-injection of both the hydrocarbon and the hydrogen peroxide and water mixture are under the control of the system controller in response to at least one of gas pressure and temperature, within at least one of the reaction vessel, the storage volume and the power generation system.

6. The method of claim 1, wherein the storage volume comprises gas transfer piping.

7. The method of claim 1, wherein the storage volume comprises a storage vessel having a larger volume than a volume of the reaction vessel.

8. The method of claim 7, wherein pressure within the storage vessel is sufficient to drive hydrogen gas over a molecular sieve to form a product gas stream further enriched in hydrogen gas.

9. The method of claim 1, wherein pulse duration and frequency of the micro-injection of both the hydrocarbon and the hydrogen peroxide and water mixture into the reaction vessel are under the control of the system controller in response to gas pressure within the storage volume.

10. The method of claim 1, wherein gas is directed from the reaction vessel to the storage volume under the control of the system controller in response to a gas pressure within the reaction vessel.

11. The method of claim 1, wherein gas is directed from the storage volume to the power generation system under the control of a pressure regulator coupled with an output valve which acts to control the pressure and flow of gas into the power generation system.

12. The method of claim 11, wherein the flow of gas into the power generation system is pulsed as a function of a pulse width command from the system controller to the output valve.

13. The method of claim 1, wherein the temperature of gases in the reaction vessel are lowered by a heat exchanger.

14. The method of claim 13, wherein the heat exchanger is a heat exchange jacket around the reaction vessel.

15. The method of claim 13, wherein the heat exchanger is between the reaction vessel and the power generation system.

16. The method of claim 1, further comprising:
    micro-injecting a mixture of hydrogen peroxide and water into a dissociation vessel containing a catalyst that encourages the dissociation of hydrogen peroxide to oxygen and water; and,
    supplying oxygen and water from the dissociation vessel to a fuel cell air input.

17. The method of claim 16, wherein the catalyst is at least one catalyst selected from the group consisting of platinum mixed oxides, vanadium-cobalt oxides, nickel, platinum, silver packs, rhodium supported on zirconia, a mixture of ceria and zirconia, iron, nickel and chromium.

18. The method of claim 16, wherein temperature of the oxygen supplied to the fuel cell air input is reduced to less than 100° C. by at least one of a heat exchanger, a coolant and a reduction in pressure.

19. The method of claim 16, wherein the microinjection of the hydrogen peroxide and water mixture into the reaction vessel is under the control of the system controller in response to at least one of:
    a. the temperature and pressure within the reaction vessel, and,
    b. the fuel cell power system output requirement.

20. The method of claim 16, wherein the supplying of oxygen and water from the dissociation vessel to the fuel cell air input is under the control of the system controller in response to at least one of:
    a. the temperature and pressure within the reaction vessel, and,
    b. the fuel cell power system output requirement.

* * * * *